US008674990B1

(12) United States Patent
Gontmakher et al.

(10) Patent No.: US 8,674,990 B1
(45) Date of Patent: Mar. 18, 2014

(54) METHODS AND SYSTEMS FOR FRACTIONAL LEVEL OF DETAIL ASSIGNMENT

(75) Inventors: Alex Gontmakher, Adliswil (CH);
Andrin von Rechenberg, Zurich (CH)

(73) Assignee: Google Inc., Mountain View, CA (US)

( * ) Notice: Subject to any disclaimer, the term of this patent is extended or adjusted under 35 U.S.C. 154(b) by 1274 days.

(21) Appl. No.: 12/507,006

(22) Filed: Jul. 21, 2009

(51) Int. Cl.
*G06T 17/00* (2006.01)
(52) U.S. Cl.
USPC ......................................................... 345/428
(58) Field of Classification Search
USPC ......................................................... 345/428
See application file for complete search history.

(56) References Cited

U.S. PATENT DOCUMENTS

2006/0103665 A1* 5/2006 Opala et al. .................... 345/619
2009/0182500 A1* 7/2009 Dicke ............................. 701/208

OTHER PUBLICATIONS

Timpf, S. (1999). *Abstraction, levels of detail, and hierarchies in map series*. Spatial Information Theory—cognitive and computational foundations of geographic information science, Stade, Germany, Freksa, Christian and Mark, David M. (eds.), Springer-Verlag, LNCS 1661, pp. 125-140.

* cited by examiner

*Primary Examiner* — Xiao M. Wu
*Assistant Examiner* — Scott E Sonners
(74) *Attorney, Agent, or Firm* — Marshall, Gerstein & Borun LLP

(57) ABSTRACT

Methods and systems for fractional level of detail assignment are described herein. A method embodiment for fractional level of detail (LOD) assignment includes obtaining a set of features and image data at a range of LOD values, assigning one or more fractional LOD values to the obtained features and providing the features and the image data at the fractional LOD values. The embodiment also includes hashing an identifier associated with each feature and computing a hash cut-off value by mapping the range of LOD levels onto a range of integers. A system embodiment includes a LOD assigner to assign fractional LOD values to features in image data and to provide the features and the image data at the fractional LOD values. The system embodiment further includes a retrieval engine to return features with a range of LOD values that include the fractional LOD values to the LOD assigner.

17 Claims, 14 Drawing Sheets

METHODS AND SYSTEMS FOR FRACTIONAL LEVEL OF DETAIL ASSIGNMENT

BACKGROUND

Background Art

In computer graphics, accounting for level of detail involves changing the complexity of a digital object representation as the digital object moves away from a viewer or according to other metrics such as object importance, speed or position. Level of detail techniques can increase efficiency and presentation quality of rendering by decreasing workload on graphics pipeline stages.

Using level of detail (LOD) assignment, applications that utilize digital imagery define a fixed spatial distribution of items displayed at a given digital zoom level of the imagery. Such a fixed spatial distribution of displayed items is undesirable to users because they are unable to control the density of displayed items. Applications that utilize digital imagery may also assign LOD values to displayed items in integer steps to facilitate indexing of the displayed items. However, assignment of LOD values to displayed items in integer steps does not allow users to fine tune the density of displayed items. Furthermore, in digital mapping applications that display several regions with different LOD values, transitions between regions of different LOD values cause abrupt changes in feature density and can be uncomfortable visually.

BRIEF SUMMARY

Embodiments of the present invention relate to systems and methods for fractional level of detail (LOD) assignment.

An embodiment for fractional level of detail (LOD) assignment includes receiving requests for image data at one or more fractional LOD values. The requests are then used to retrieve a set of matching features at integer LOD values. Fractional LOD values are then assigned to the features in the retrieved image data and the image data is provided to a user at the requested fractional LOD values. The embodiment also includes hashing a respective identifier associated with each retrieved feature and computing a hash cutoff value by mapping a range of retrieved integer LOD levels onto a range of integers.

Another embodiment includes smoothing transitions between image data displayed at different level of detail (LOD) values by computing fractional LOD values of a plurality of features in retrieved image data and shifting LOD levels of the features by a fractional LOD step for a specified change in feature density. Yet another embodiment includes smoothing distribution of displayed features where feature distribution changes temporally.

In this way, embodiments of the invention assign fractional LOD values to features. Furthermore, embodiments of the invention can be used to fine tune density of displayed features, and to smooth density transitions of features in systems that display regions having different LOD values in a single view-port.

Further embodiments, features, and advantages of the invention, as well as the structure and operation of the various embodiments of the invention are described in detail below with reference to accompanying drawings.

BRIEF DESCRIPTION OF THE DRAWINGS

Embodiments of the invention are described with reference to the accompanying drawings. In the drawings, like reference numbers may indicate identical or functionally similar elements. The drawing in which an element first appears is generally indicated by the left-most digit in the corresponding reference number.

DETAILED DESCRIPTION

Embodiments of the present invention relate to systems and methods for fractional level of detail (LOD) assignment.

An embodiment for fractional level of detail (LOD) assignment includes receiving requests for image data at one or more fractional LOD values. The requests are then used to retrieve a set of matching features at integer LOD values. Fractional LOD values are then assigned to the features in the retrieved image data and the image data is provided to a user at the requested fractional LOD values. The embodiment also includes hashing a respective identifier (or one or more properties of an identifier) associated with each retrieved feature and computing a hash cutoff value by mapping the range of retrieved LOD levels onto a range of integers.

In this way, embodiments assign fractional LOD values to features. Furthermore, embodiments can be used to fine tune density of displayed features, and to smooth density transitions of features in systems that display regions having different LOD values in a single view-port.

While the present invention is described herein with reference to illustrative embodiments for particular applications, it should be understood that the invention is not limited thereto. Those skilled in the art with access to the teachings provided herein will recognize additional modifications, applications, and embodiments within the scope thereof and additional fields in which the invention would be of significant utility.

Figure 1:
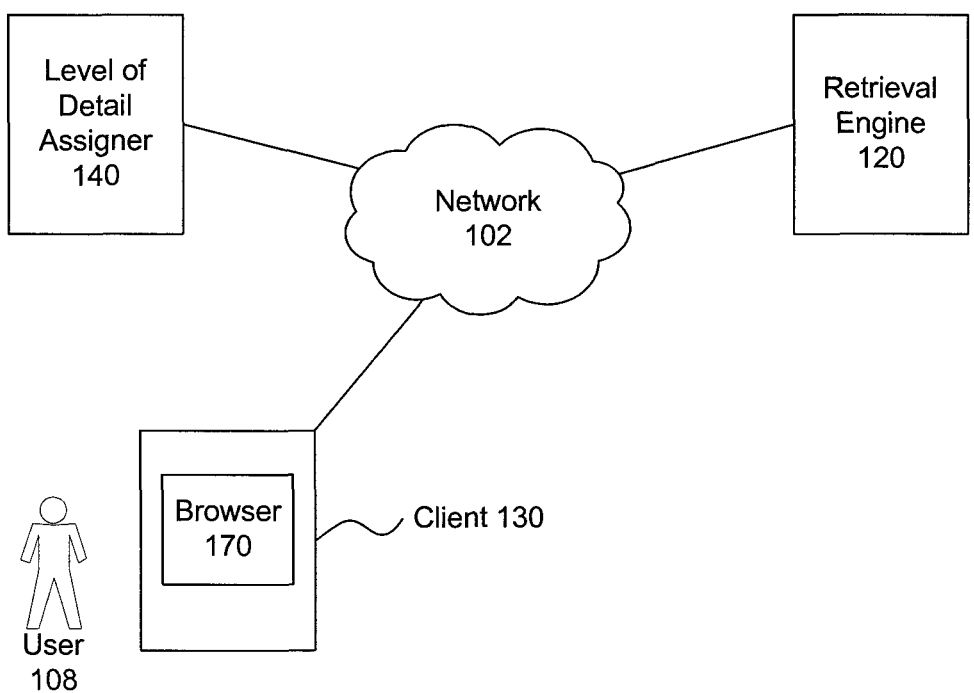
FIG. 1 is a diagram illustrating a system for fractional level of detail assignment, according to an embodiment.

This detailed description of the embodiments of the present invention is divided into several sections as shown by the following table of contents:

Table of Contents
1. System
2. Retrieval Engine 120
3. LOD Assigner 140
   3.1. Hashing Engine 210 and LOD Mapper 220
4. Smoothing Distribution of Displayed Features
5. Smoothing Distribution of Displayed Features Using Fractional Time Steps
6. Example Computer Embodiment 1. System This section describes a system for fractional level of detail (LOD) assignment according to an embodiment illustrated in FIG. 1. FIG. 1 is a diagram of system 100 for fractional level of detail (LOD) assignment. (While the following is described in terms of FIG. 1, the invention is not limited to this embodiment. For example, any system having generally the structure of FIG. 1, or that would benefit from the operation, methods and functions as described herein may be used.)

System 100 includes level of detail assigner 140, retrieval engine 120, and client 130. Client 130 further includes browser 170. User 108 may communicate with browser 170 through client 130.

Client 130 may be implemented on a computing device. Such a computing device can include, but is not limited to, a personal computer, mobile device such as a mobile phone, workstation, embedded system, game console, television, set-top box, or any other computing device that can support web browsing or processing of digital image data. Such a computing device may include, but is not limited to, a device having a processor and memory for executing and storing instructions. Such a computing device may include software, firmware, hardware or any combination thereof. Software may include one or more applications and an operating system. Hardware can include, but is not limited to, one or more processors, memory and a graphical user interface display. An optional input device, such as a mouse or touch screen, may be used. LOD assigner 140 may provide content that can be retrieved by client 130 over network 102. Content retrieved by client 130 can be displayed to user 108 by browser 170.

Network 102 may include one or more networks, including but not limited to, a local area network, medium-area network, and/or wide-area network, such as, the Internet. Network 102, for example, may be a wired or wireless network that allows client 130, retrieval engine 120, and LOD assigner 140 to communicate with each other. Network 102 can further support world-wide web protocols and services.

Browser 170 can communicate with LOD assigner 140 and shape retrieval engine 120 over network 102. Browser 170 can further communicate with an input (not shown) to allow a user to input data, to input commands, or to provide other control information to browser 170. User 108 may communicate with browser 170 using client 130. As an example, user 108 may provide a location identifier to browser 170 to retrieve and display content corresponding to the location identifier (such as, a URL or filename). Browser 170 may then provide a request for content to retrieval engine 120. Retrieval engine 120 may respond to the request by providing content back to browser 170 through LOD assigner 140 and client 130 over network 102.

Retrieval engine 120 provides image data for locations or regions. In one example, these locations or regions may be specified by user 108.

In an embodiment, retrieval engine 120 provides spatial image data at one or more LOD levels to LOD assigner 140. LOD assigner 140 may then assign fractional LOD values to features in the image data received from retrieval engine 120. Fractional LOD values may include any non-integer LOD value (e.g. 0.1, 0.001, 0.032 etc.). LOD assigner 140 then provides the image data and the features at fractional LOD values to client 130. Client 130 may then display the data received from LOD assigner 140 to user 108 through browser 170.

As an purely illustrative example, if client 130 requests data at a fractional LOD value of '0.3', retrieval engine 120 may return image data that lies in an integer LOD step of '0 to 1'. This is because retrieval engine 120 may be configured to return image data in integer LOD steps. Although this integer LOD range includes the requested fractional LOD value of 0.3, it is desirable to display and correctly map features in the retrieved image data to the fractional LOD value of 0.3. This is because features in the retrieved image data are associated with the integer LOD step of '0 to 1'. This operation of assigning fractional LOD values to the features is performed by LOD assigner 140.

As an example, assignment of fractional LOD values can performed online (i.e. in real time) or offline (i.e. pre-processed) by LOD assigner 140. Furthermore, for example, fractional LOD assignment may also be performed by retrieval engine 120 or client 130. In an embodiment, there may exist a plurality of retrieval engines to allow for an N-tier infrastructure or a server farm, where the plurality of retrieval engines index and provide image data for fractional LOD assignment to LOD assigner 140.

The operation of retrieval engine 120 and LOD assigner 140 is described in detail further below.

2. Retrieval Engine 120

Retrieval engine 120 provides image data for locations or spatial regions. In one example, these locations or regions may be specified by user 108. In an embodiment, retrieval engine 120 provides spatial image data at one or more LOD levels to LOD assigner 140. LOD assigner 140 may then assign fractional LOD values to features in the image data received from retrieval engine 120. LOD assigner 140 then provides image data at fractional LOD values to client 130. Client 130 may then display image data retrieved from LOD assigner 140 to user 108 through browser 170 or other applications at client 130.

Figure 2A:
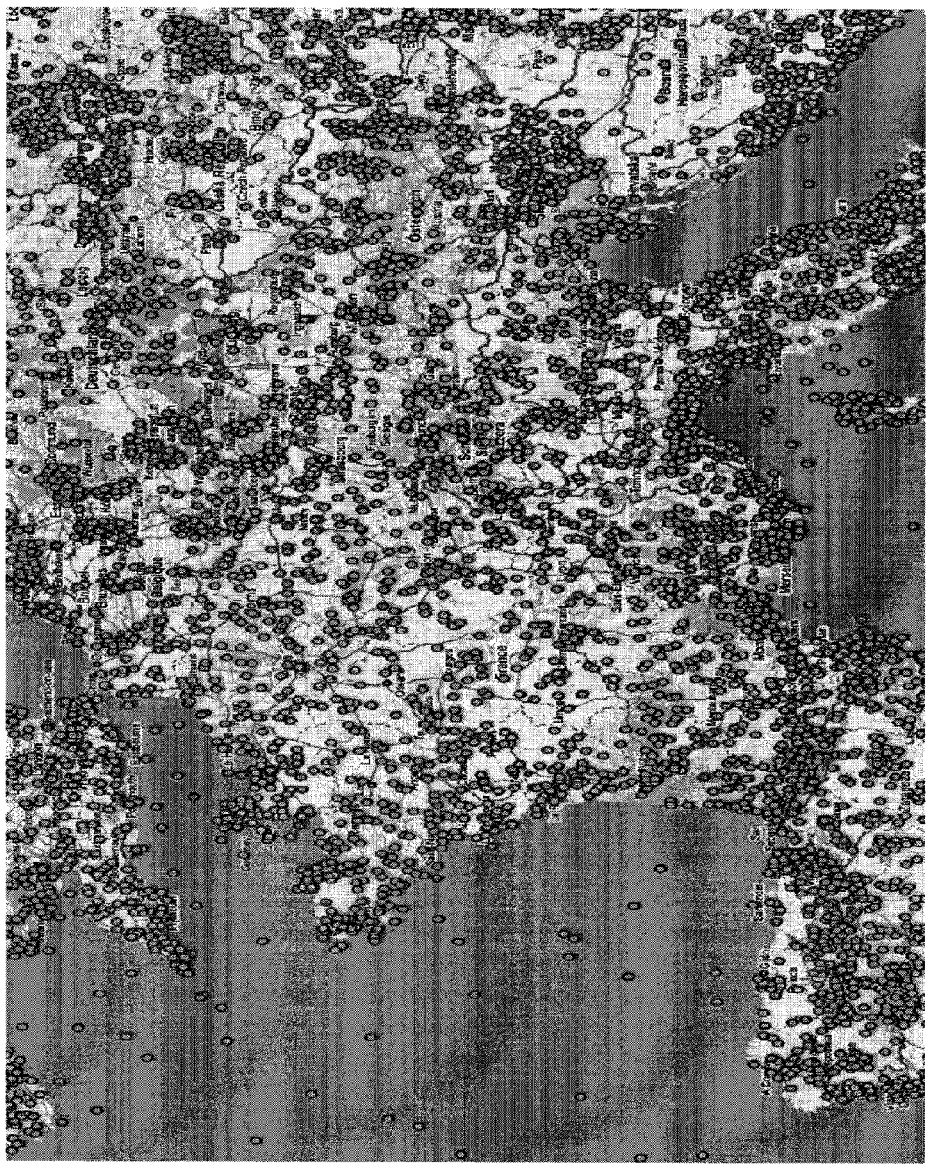
FIG. 2A illustrates a plurality of exemplary features at a LOD level, according to an embodiment.

FIG. 2A illustrates spatial image data (such as map data) that includes a plurality of exemplary features at a LOD level. Features can refer to results of a general image processing operation (e.g. feature extraction or feature detection) applied to an image, or specific structures in the image itself, ranging from simple structures such as points or edges to more complex structures such as objects. Other examples of features are related to motion in image sequences, to shapes defined in terms of curves or boundaries between different image regions, or to properties of such a region. As an example, features may include images (e.g. PNG images) overlaid or embedded within spatial image data. Features may also include three dimensional structures or even two dimensional regions within displayed image data. These examples are purely illustrative and are not intended to limit the invention.

Figure 2B:
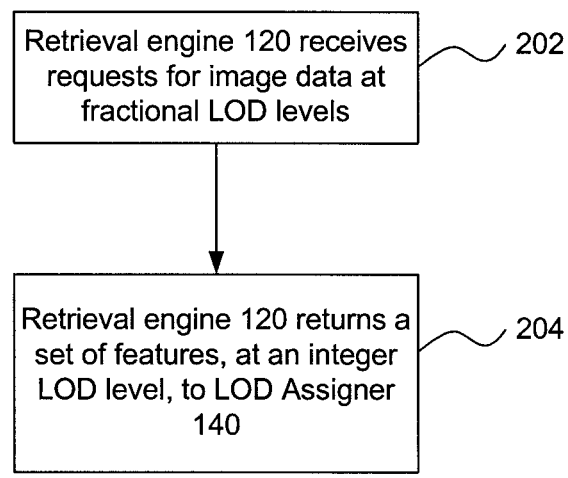
FIG. 2B is a flowchart illustrating an operation of a retrieval engine, according to an embodiment.

FIG. 2B is a flowchart illustrating an exemplary operation of retrieval engine 120, according to an embodiment. (Although the following is described in terms of integer LOD levels and evenly distributed LOD steps, it is to be appreciated that the invention is not limited to this embodiment. For example, retrieval engine 120 may receive data at one half or any other fractional LOD step.)

Method 200 begins with retrieval engine 120 receiving requests for image data at a fractional LOD level from client 130 (step 202). As an example, such requests may be received from user 108 through client 130. User 108, for example, may zoom into (or zoom out of) a digital map or a digital three dimensional representation of a spatial region displayed in browser 170. Such an action would cause client 130 to provide requests for digital image data to retrieval engine 120 at a fractional LOD level.

Retrieval engine 120 returns a set of features to LOD assigner 140 at an integer LOD level in response to step 202 (step 204). As described earlier, if client 130 requests data at a fractional LOD value of '0.3', retrieval engine 120 may return image data that lies in an integer LOD step of '0 to 1'. Although this integer LOD range includes the requested fractional LOD value of 0.3, it is necessary to display features in the retrieved image data at the requested fractional LOD value of 0.3. This is because features in the retrieved image data are currently associated with the integer LOD step of '0 to 1'. This operation of assigning fractional LOD values to the features is performed by LOD assigner 140. LOD assigner 140 may assign fractional LOD values to the features received in step 204 as described below.

3. LOD Assigner 140

As described earlier, client 130 may provide requests to retrieval engine 120 at an fractional LOD level. In response to requests received from client 130, retrieval engine 120 provides a set of features within a range of LOD levels that include the requested fractional LOD level. LOD assigner 140 then assigns the requested fractional LOD values to the features that are returned by retrieval engine 120.

Figure 2C:
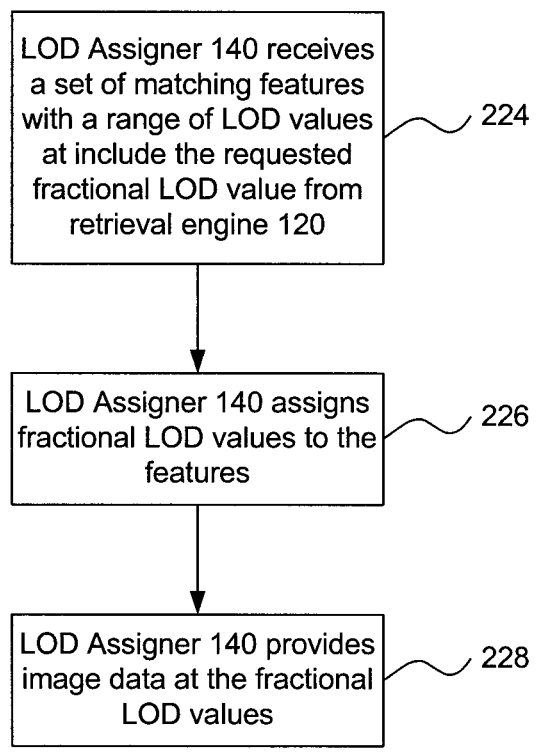
FIG. 2C is a flowchart illustrating an operation of a LOD assigner, according to an embodiment.

FIG. 2C is a flowchart illustrating an exemplary operation of LOD assigner 140, according to an embodiment.

Method 220 begins with LOD assigner 140 receiving a set of matching features with a range of LOD levels that include the requested fractional LOD level from retrieval engine 120 (step 224).

LOD assigner 140 then assigns fractional LOD values to the features received from retrieval engine 120 (step 226).

LOD assigner 140 provides image data and associated features at the fractional LOD values to client 130 (step 228).

In an embodiment, to assign fractional LOD values to features and to perform step 226, LOD assigner 140 uses hashing engine 210 and LOD mapper 220 which are described below.

3.1 Hashing Engine 210 and LOD Mapper 220

Figure 2D:
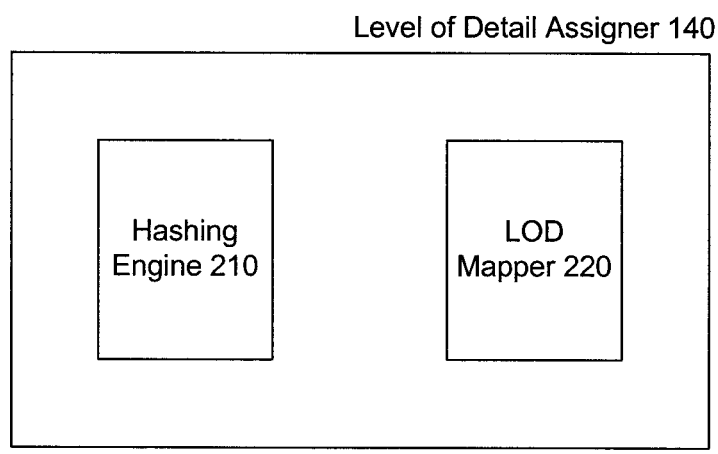
FIG. 2D is a diagram illustrating a LOD assigner, according to an embodiment.

FIG. 2D illustrates a diagram of LOD assigner 140 in greater detail. As shown in FIG. 2D, LOD assigner 140 includes hashing engine 210 and LOD mapper 220. In an embodiment, LOD assigner 140 uses hashing engine 210 and LOD mapper 220 to assign fractional LOD values to features received from retrieval engine 120.

In an embodiment, hashing engine 210 computes a hash of a feature identifier of each feature returned by retrieval engine 120. As an example, each feature returned by retrieval engine 120 in response to a request from client 130 may be associated with a corresponding feature identifier (ID).

As described earlier, features can refer to results of a general image processing operation (e.g. feature extraction or feature detection) applied to an image, or specific structures in the image itself, ranging from simple structures such as points or edges to more complex structures such as objects. Features may include images (e.g. JPEG images) overlaid or embedded within spatial image data. Features may also include three dimensional structures (e.g. buildings or street objects) or even two dimensional regions (e.g. tiles) within displayed image data. These examples are purely illustrative and are not intended to limit the invention.

A respective feature ID, associated with each feature, for example, may include numbers, alphabets, compound values or any alphanumeric or symbolic combination. A hash computed for features by hashing engine 210 may also use any other subset of properties of the features other than a feature ID. As an example, hashing engine 210 may use any parameter associated with the features that may be stable and distinct across the features. In another example, feature properties (or parameters) need not be distinct across features but may vary across a pre-defined range.

In an embodiment, once hashing engine 210 has hashed a feature ID (or any other parameter associated with a feature), LOD mapper 220 computes a hash cut-off for the fractional part of a LOD associated with the feature. As a purely illustrative example, for a LOD 'c' in range of '0 to 1', LOD mapper 220 may compute a hash cut-off by mapping the range of '0 to 1' onto a range of valid 32 bit integers or any other integer range. This operation by LOD mapper 220 includes comparing a threshold (e.g. M(c)) obtained by mapping the range of '0 to 1' onto a range of valid 32 bit integers (or any other integer range) to a hashed feature ID (e.g. H(f_id)) generated by hashing engine 210.

In an embodiment, mapping M of an integer LOD range of '0 to 1' onto a LOD range of '0 to R' that increments the number of features by a factor for one LOD step can be computed by LOD mapper 220 as, $$M(c)=R*(K^C-1)/(K-1) \tag{a}$$

where, c represents a LOD value, M(c) represents a mapping of LOD c and R represents a LOD range and K represents a change (e.g. increase) in the number of features per LOD step.

Referring to formula (a), an integer LOD range of '0-1' would be associated with a specific number of features. When this integer LOD range is mapped to a LOD range of 0-R, the number of features associated with this LOD range would be changed by a factor (e.g. F), determined by mapping function M(c). As a purely illustrative example, a mapping function such as M(0.3) would provide the number of features to be displayed at a fractional LOD step of 0.3. Another example of a mapping function is described further below.

In an embodiment, LOD assigner 140 can use upper-bound and lower-bound cutoffs in order to provide client 130 with a LOD range of non-unit length. For example, to display all the features in a LOD range of 7.3 to 9.5, retrieval engine 120 would retrieve LODs in a integer LOD range of 7 to 10 and provide these LODs to LOD assigner 140.

LOD assigner 140 would then, for example, filter out all features at a LOD of 7 such that H(f_id)<M(0.3), and all features at a LOD of 9 such that H(f_id)>M(0.5), where H(f_id) represents a hash of a feature ID computed by hashing engine 210, c represents an LOD value and M(c) represents a mapping function evaluated by LOD mapper 220.

Figure 3:
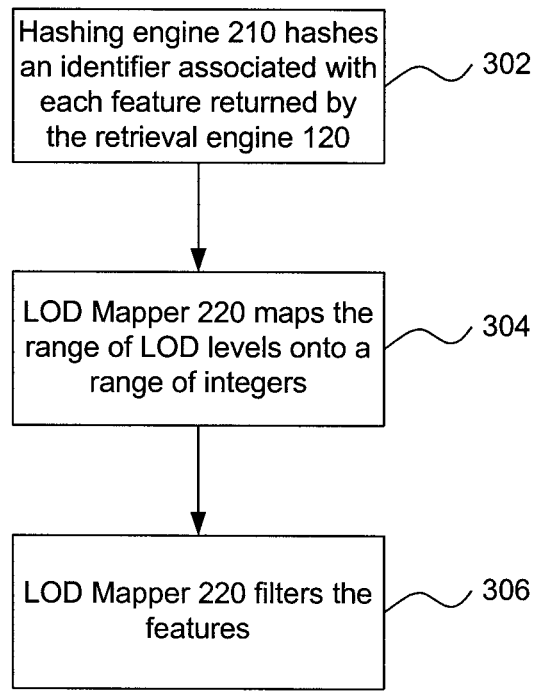
FIG. 3 is a flowchart illustrating computation of a hash cut-off, according to an embodiment.

FIG. 3 illustrates an exemplary operation of hashing engine 210 and LOD mapper 220, according to an embodiment.

Hashing engine 210 hashes an identifier associated with each feature returned by retrieval engine 120 (step 302). As an example, each feature returned by retrieval engine 120 in response to a request from client 130 may be associated with a feature identifier (ID). Hashing engine 210 would then compute a value of H(f_id) as described above.

LOD mapper 220 then maps a range of LOD levels, returned by retrieval engine 120, onto a range of valid 32 bit integers or any other integer range (step 304). For example, LOD mapper 220 would compute M(c) as described above, where M(c) represents a mapping of LOD c (step 304).

LOD mapper 220 then filters out all features at a LOD of 'c' such that H(f_id)<M(c), where c represents an LOD value and M(c) represents a mapping function computed by LOD mapper 220 (step 306).

As a illustrative example, not intended to limit the invention, a mapping by LOD mapper 220 may be based on the mapping function, $$M(c) = 2^{32} * (4^c - 1)/3 \quad \text{(b)}$$

where c represents a LOD value and M(c) represents a mapping of LOD c.

By using the mapping function M(c), filtering (i.e. display of fractional LODs) can be made consistent with increments in the number of features displayed by client 130. As an example, the number of displayed features may bear an exponential relation with a digital zoom level set by user 108 in client 130. Also referring to exemplary formula (b), the value of constant K is set to 4. This is because, in this illustrative example, one LOD step (e.g. a step change in the zoom level of displayed data) is associated with a two fold linear increase, which leads to a four fold spatial increase in the displayed data. By setting the value of constant K to 4, embodiments of the invention keep spatial density of displayed features constant by achieving a four fold increase in the number of features to match the four fold spatial increase in the displayed data.

It is to be appreciated that any other function that uses different numerical weights from those shown in mapping function formulae (a) and (b) may be used. Similarly, other functions that cause mapping between a range of LODs to a range of integers may be used. Mapping function M(c) can be adapted by LOD mapper 220 for any rate of change of feature density increments between discrete LOD steps.

In an embodiment, LOD assigner 140 can limit the range of returned LODs to less than a single integer LOD step by requesting features from retrieval engine 120 at a single integer LOD step and then filtering them as described above. In this way, embodiments allow the use of retrieval engine 120, that delivers image data in discrete integer LOD steps, to display image data in fine-grained LOD levels provided by LOD assigner 140. As an illustrative example, client 130 can request data for integer LOD levels in a range of 7 to 8, and LOD assigner 140 can filter feature IDs associated with the requested LOD levels (i.e. 7 to 8) dynamically into two sub-ranges by filtering the feature IDs into exemplary ranges of 0 to 0.5 and 0.5 to 1.

Figure 4:
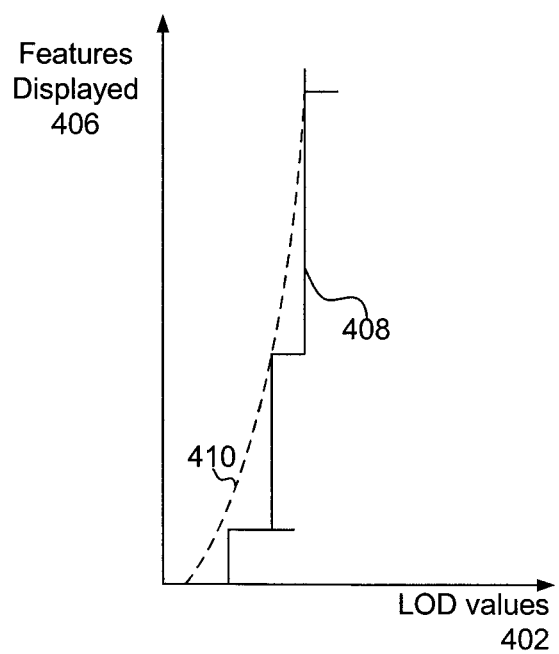
FIG. 4 illustrates an exemplary graph showing a rate of change of displayed features with respect to LOD values.

In another embodiment, LOD assigner 140 can interpolate the number of features retrieved by retrieval engine 120 to compute features at discrete LOD steps. As an example, not intended to limit the invention, linear interpolation can be used by LOD assigner 140 for fast results. Other interpolation algorithms may also be used by LOD assigner 140. FIG. 4 illustrates an exemplary graph that plots features displayed 406 against LOD values 402. Graph 408 refers to the actual relation between features displayed 406 and LOD values 402. Graph 410 illustrates a interpolation of points on graph 408 accomplished by LOD assigner 140, according to embodiments of the invention.

Interpolation by LOD assigner 140 can be particularly useful in scenarios where assigning fractional LOD values for each feature returned by retrieval engine 120 may be computationally intensive for LOD assigner 140. An exemplary probabilistic method for interpolation of displayed features is described below.

Figure 5:
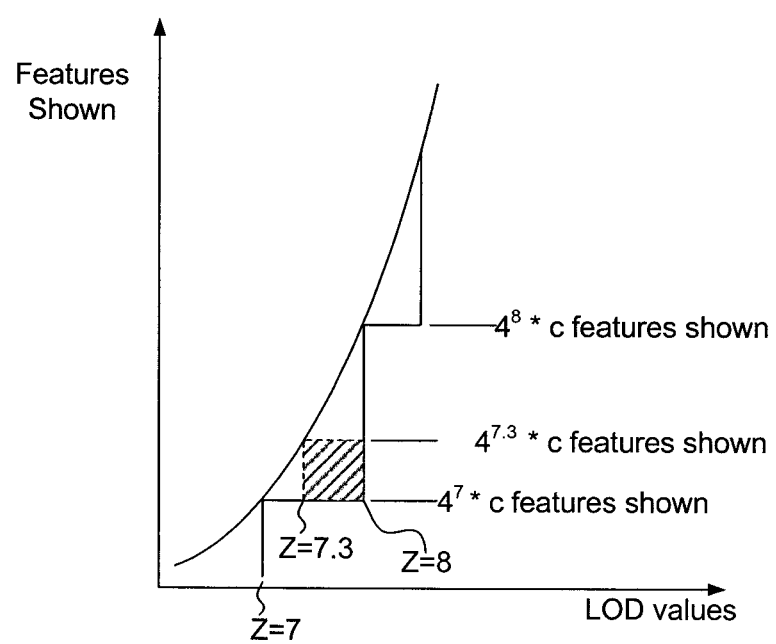
FIG. 5 is a graph illustrating exemplary values that can be used to compute the probability of a feature to be filtered at a fractional zoom level, according to an embodiment.

Referring to FIG. 5, which an exemplary graph illustrating features shown with respect to LOD values, the probability of a feature that appears between zoom level 7 and zoom level 8 can be computed by LOD assigner 140 as, $$\frac{4^{7.3} - 4^7}{4^8 - 4^7} = \frac{4^{0.3} - 1}{3}$$

Generalizing for a probabilistic distribution that increases the number of features displayed by client 130 at a zoom level by a factor of k, the probability of a feature to be filtered at a fractional zoom level by LOD assigner 140 may be given as follows:

$$P(k, f) = \frac{k^f - 1}{k - 1}$$

where, P (k,0)=0 and P (k,1)=1

In an embodiment, LOD assigner 140 may use a pre-computed set of fractional LOD steps rather than computing fractional steps in real-time. As an example, such a pre-computed set of fractional LOD steps may be computed offline. Pre-computing fractional LOD steps may increase efficiency of filtering results directly because a single result set returned from retrieval engine 120 may be used by LOD assigner 140 to compute all fractional LOD sub-ranges.

In another embodiment, LOD assigner 140 can assign fractional LOD values to features based on their importance within image data. For example, LOD assigner 140 may use a indexing system to rank features, received from retrieval engine 120, based on their importance within image data. Importance of a feature, for example, may be based on its size within image data.

4. Smoothing Distribution of Displayed Features

In an embodiment, fractional LOD assignment may also be used for smoothing distribution of displayed features in clients. Such clients can include, but are not limited to, mapping applications and 3D data viewing applications, such as, Google Maps or Google Earth applications.

Figure 6:
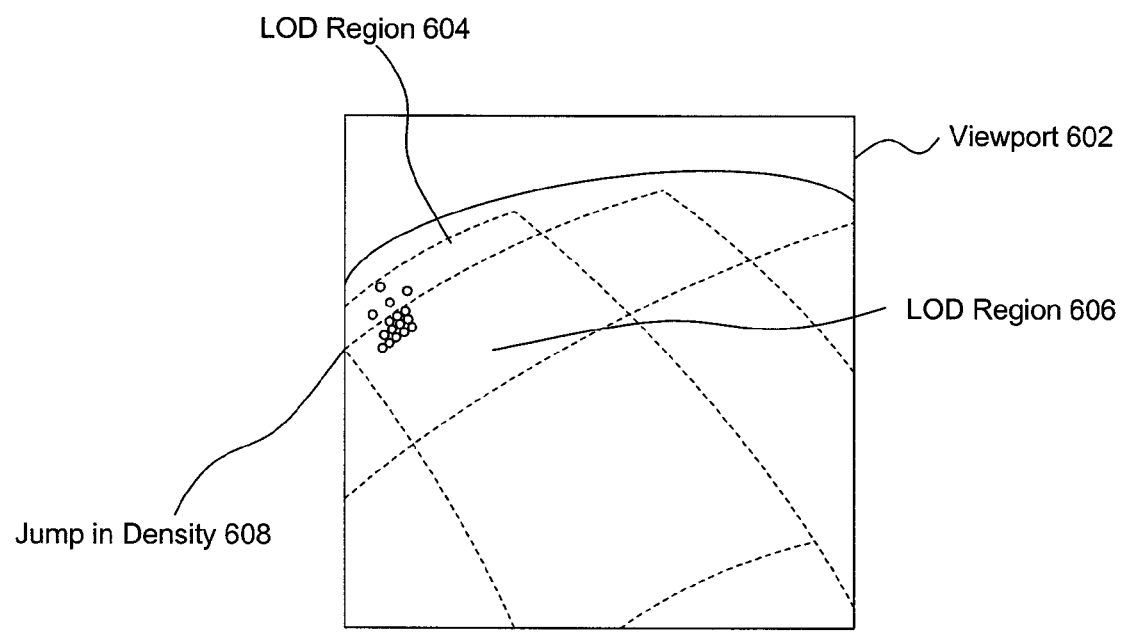
FIG. 6 illustrates a plurality of exemplary LOD regions within a view-port.

FIG. 6 illustrates a plurality of LOD regions within view-port 602. As shown in FIG. 6, there exists a jump in density of displayed features 608 on the border between LOD region 604 and LOD region 606. This jump in density occurs because the number of displayed features in LOD region 606 is substantially greater in LOD region 606 as compared to LOD region 604. Such changes in density of displayed features across LOD regions may be unpleasant to a viewer.

Figure 7A:
FIG. 7A illustrates exemplary spatial image data with a shift in density of displayed items.

FIG. 7A illustrates a view-port 702 showing a plurality of displayed features. As illustrated in FIG. 7, there exists a jump in density of displayed features on border LOD region 712. As described above, this jump in density occurs because the number of displayed features in one LOD region is substantially greater than the adjacent LOD region.

Figure 7B:
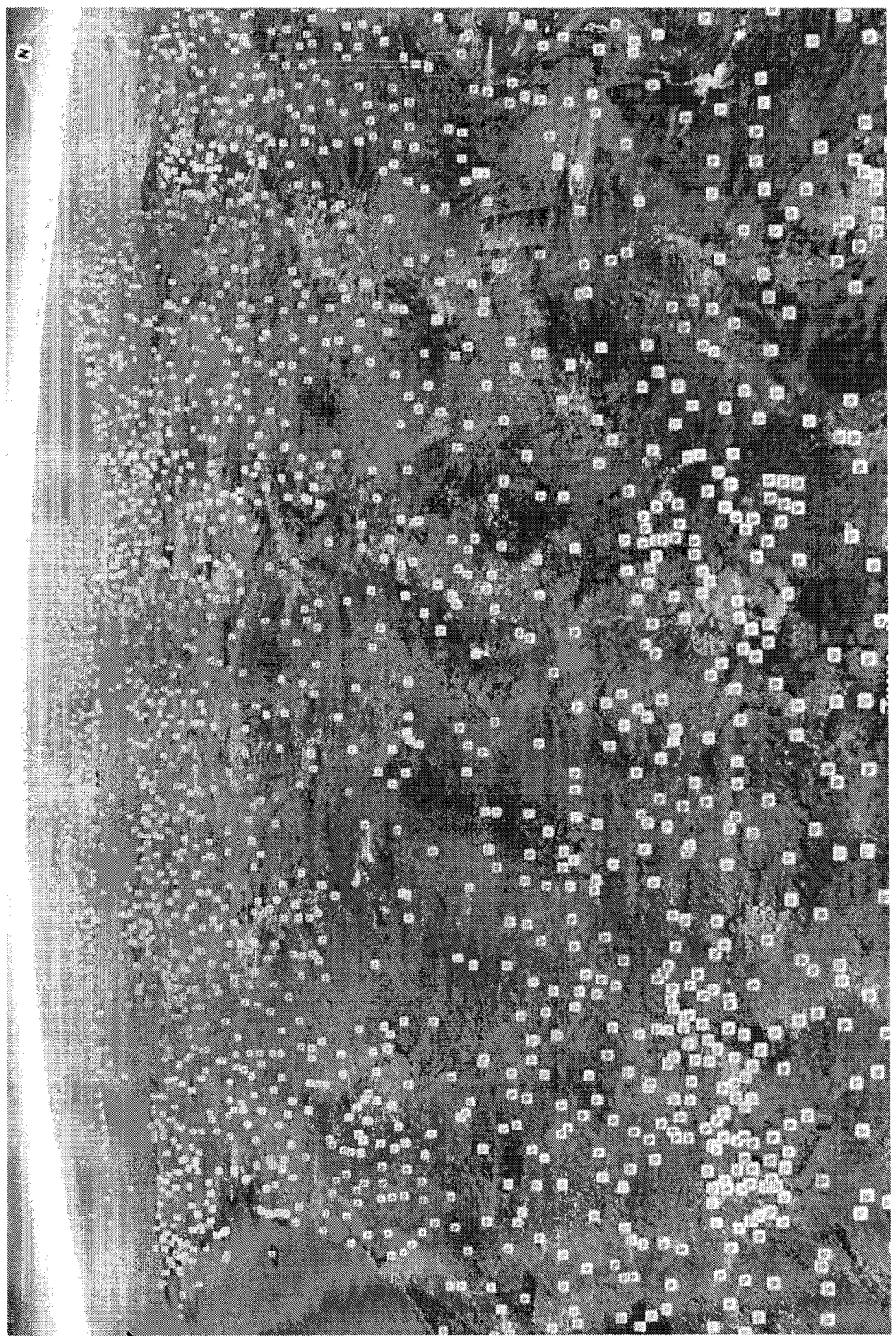
FIG. 7B illustrates a smoother frequency distribution of displayed items of FIG. 7A, according to an embodiment.

FIG. 7B illustrates view-port 702 after fractional LOD assignment has been performed by LOD assigner 140 to smooth distribution of displayed features. As illustrated in FIG. 7B, there is no longer a 'jump' or a drastic change in the density of displayed features in view-port 702. It is apparent from FIG. 7B that embodiments of the invention have caused a smooth distribution of displayed features allowing for a better viewing experience.

In this way, by using fractional LOD assignment described above, LOD assigner 140 can use fractional LOD steps to allow for a smoother density transitions between regions having different LOD values. Furthermore, computational cost of fractional LOD assignment by LOD assigner 140 is minimal as a single request and subsequent receipt of image data at integer LOD values from retrieval engine 120 can be translated into a plurality of fractional LOD values by LOD assigner 140.

5. Smoothing Distribution of Displayed Features Using Fractional Time Steps

Embodiments of the invention also allow for smoothing distribution of displayed features where feature distribution changes temporally. Feature distribution may change temporally between image frames that are a part of a video or any animated sequence.

As an example, two or more consecutive image frames in an animated sequence may differ abruptly in their respective number of displayed features. This can cause a jump in density of displayed features between the two or more consecutive frames. Such changes in density of displayed features may be unpleasant to a viewer.

Figure 8A:
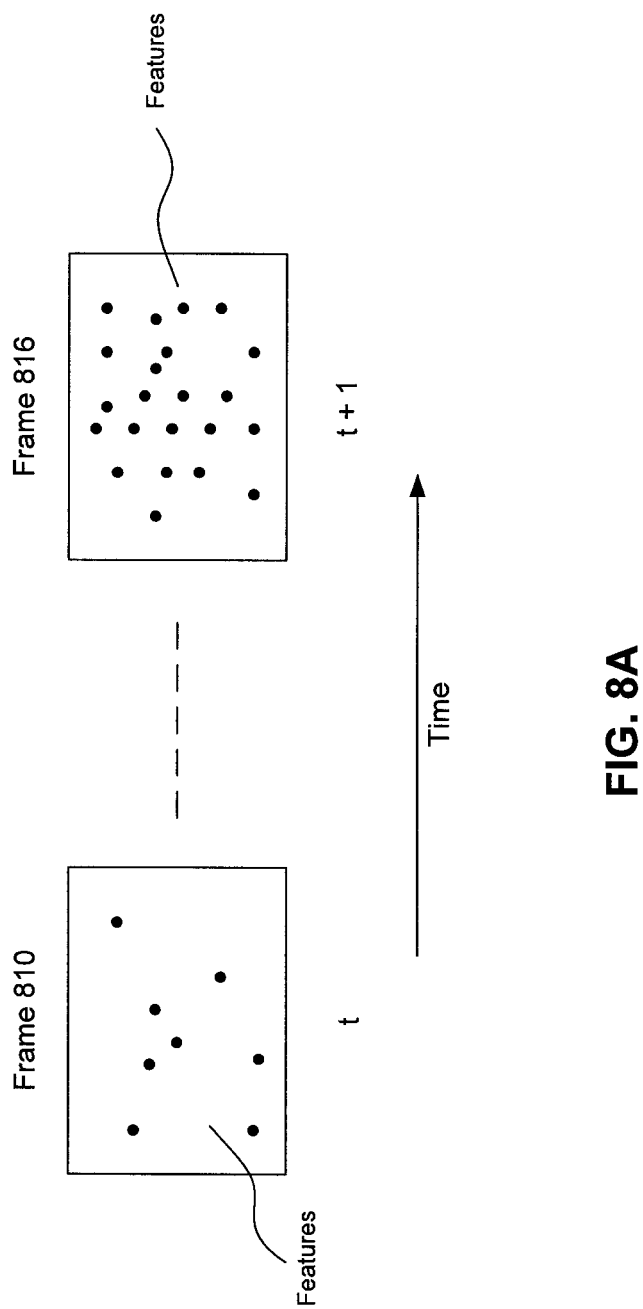
FIG. 8A illustrates image frames at discrete time steps, according to an embodiment.

FIG. 8A illustrates two consecutive image frames, 810 and 816, that differ in their respective number of displayed features. Frame 810 appears at time t and frame 816 appears at discrete time step t+1. As shown in FIG. 8A, frame 816 appearing at discrete time step t+1 includes substantially greater number of features than frame 810 appearing at time t. If frames 810 and 816 are animated by rapidly presenting them to a user at times t and t+1 respectively, such substantial changes in the number of displayed features across frames 810 and 816 may be unpleasant to a viewer.

In an embodiment, LOD assigner 140 can smooth distribution of displayed features using a plurality of fractional time steps (e.g. t, t+0.1, t+0.2 . . . t+1) instead of a lesser number of discrete time steps (e.g. t and t+1). As an example, LOD assigner 140 can interpolate the number of features between discrete time steps t and t+1 to compute features at fractional time steps (e.g. t+0.1 and t+0.2). As an example, an interpolation technique could be chosen to match the estimated rate of change in the number of features as a function of time, or even as linear function when the rate is unknown. It is to be appreciated that these interpolation techniques are purely illustrative any other interpolation technique or optimization of an interpolation technique may be used.

Figure 8B:
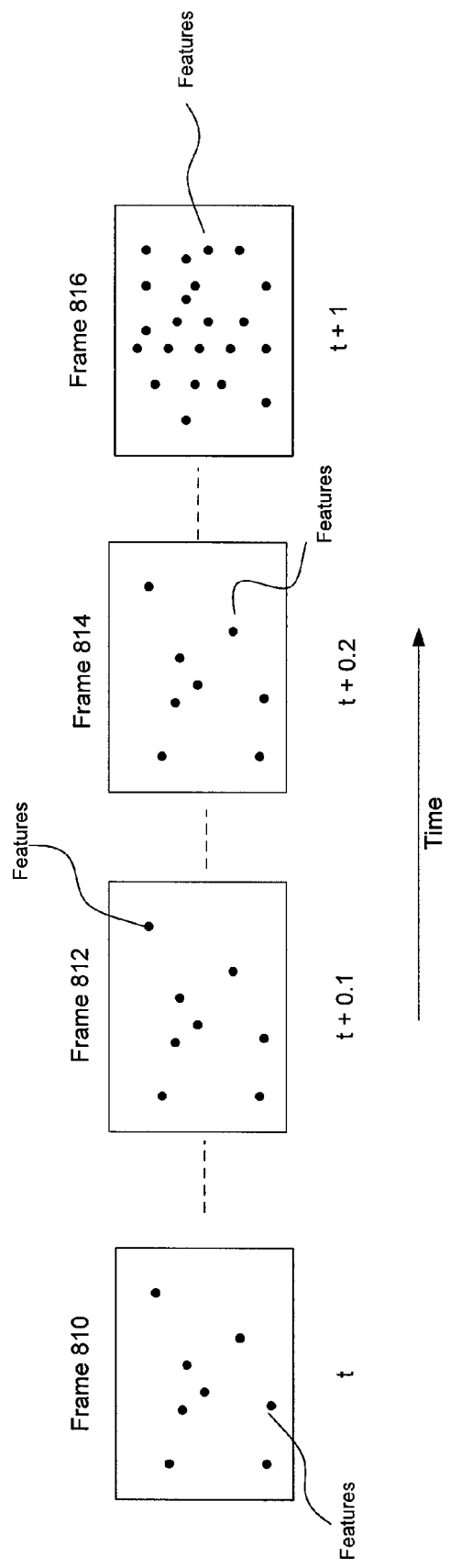
FIG. 8B illustrates image frames at fractional time steps, according to an embodiment.

FIG. 8B illustrates frames 810, 812, 814 and 816 after fractional time steps have been assigned by LOD assigner 140. As illustrated in FIG. 8B, there is no longer a 'jump' or a drastic change in the density of displayed features between frames occurring at fractional time steps t, t+0.1, t+0.2 and t+1. It is apparent from FIG. 8B that embodiments of the invention have caused a smooth distribution of displayed features allowing for a better viewing experience of image frames that are to be animated and presented as videos.

6. Example Computer Embodiment

Figure 9:
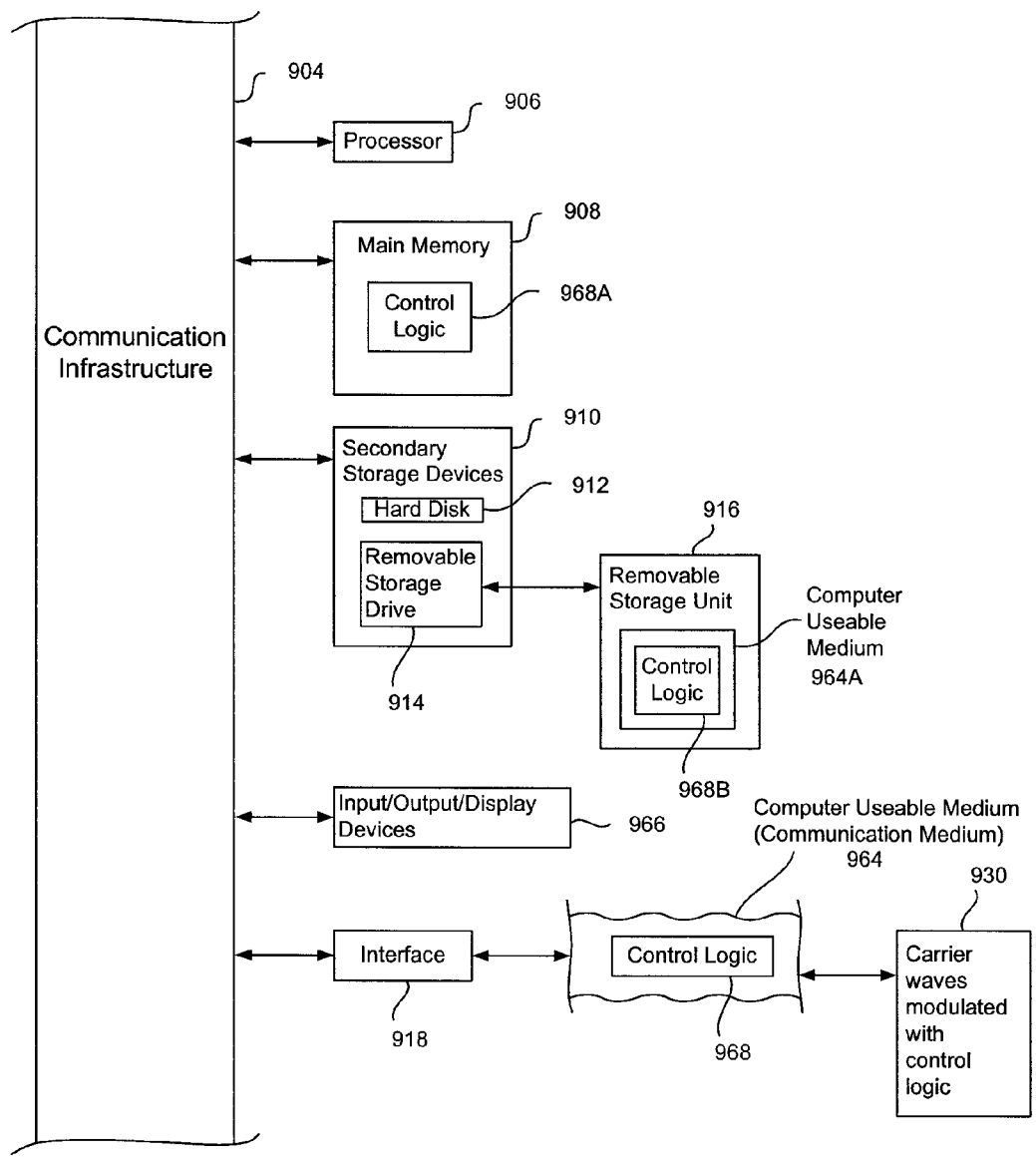
FIG. 9 illustrates an example computer useful for implementing components of an embodiment.

In an embodiment of the present invention, the system and components of embodiments described herein are implemented using well known computers, such as example computer 902 shown in FIG. 9. For example, retrieval engine 120, LOD assigner 140 or client 130 can be implemented using computer(s) 902.

The computer 902 can be any commercially available and well known computer capable of performing the functions described herein, such as computers available from International Business Machines, Apple, Sun, HP, Dell, Compaq, Digital, Cray, etc.

The computer 902 includes one or more processors (also called central processing units, or CPUs), such as a processor 906. The processor 906 is connected to a communication infrastructure 904.

The computer 902 also includes a main or primary memory 908, such as random access memory (RAM). The primary memory 908 has stored therein control logic 928A (computer software), and data.

The computer 902 also includes one or more secondary storage devices 910. The secondary storage devices 910 include, for example, a hard disk drive 912 and/or a removable storage device or drive 914, as well as other types of storage devices, such as memory cards and memory sticks. The removable storage drive 914 represents a floppy disk drive, a magnetic tape drive, a compact disk drive, an optical storage device, tape backup, etc.

The removable storage drive 914 interacts with a removable storage unit 916. The removable storage unit 916 includes a computer useable or readable storage medium 924 having stored therein computer software 928B (control logic) and/or data. Removable storage unit 916 represents a floppy disk, magnetic tape, compact disk, DVD, optical storage disk, or any other computer data storage device. The removable storage drive 914 reads from and/or writes to the removable storage unit 916 in a well known manner.

The computer 902 also includes input/output/display devices 922, such as monitors, keyboards, pointing devices, etc.

The computer 902 further includes a communication or network interface 918. The network interface 918 enables the computer 902 to communicate with remote devices. For example, the network interface 918 allows the computer 902 to communicate over communication networks or mediums 924B (representing a form of a computer useable or readable medium), such as LANs, WANs, the Internet, etc. The network interface 918 may interface with remote sites or networks via wired or wireless connections.

Control logic 928C may be transmitted to and from the computer 902 via the communication medium 924B. More particularly, the computer 902 may receive and transmit carrier waves (electromagnetic signals) modulated with control logic 930 via the communication medium 924B.

An article of manufacture comprising a computer useable or readable medium having control logic (software) stored therein is referred to herein as a computer program product or program storage device. This includes, but is not limited to, main memory 908, secondary storage devices 910, the removable storage unit 916 and the carrier waves modulated with control logic 930. Such computer program products, having control logic stored therein that, when executed by one or more data processing devices, cause such data processing devices to operate as described herein, represent embodiments of the invention. The term tangible computer program product is used herein to refer to any computer program product but not including a carrier wave or signal alone modulated with control logic.

Embodiments of the invention can work with software, hardware, and/or operating system implementations other than those described herein. Any software, hardware, and operating system implementations suitable for performing the functions described herein can be used. Embodiments of the invention are applicable to a client, a server or a combination of both.

The Summary and Abstract sections may set forth one or more but not all exemplary embodiments of the present invention as contemplated by the inventor(s), and thus, are not intended to limit the present invention and the appended claims in any way.

The present invention has been described above with the aid of functional building blocks illustrating the implementation of specified functions and relationships thereof. The boundaries of these functional building blocks have been arbitrarily defined herein for the convenience of the description. Alternate boundaries can be defined so long as the specified functions and relationships thereof are appropriately performed.

The foregoing description of the specific embodiments will so fully reveal the general nature of the invention that others can, by applying knowledge within the skill of the art, readily modify and/or adapt for various applications such specific embodiments, without undue experimentation, without departing from the general concept of the present invention. Therefore, such adaptations and modifications are intended to be within the meaning and range of equivalents of the disclosed embodiments, based on the teaching and guidance presented herein. It is to be understood that the phraseology or terminology herein is for the purpose of description and not of limitation, such that the terminology or phraseology of the present specification is to be interpreted by the skilled artisan in light of the teachings and guidance.

The breadth and scope of the present invention should not be limited by any of the above-described exemplary embodiments, but should be defined only in accordance with the following claims and their equivalents.

What is claimed is:

1. A computer implemented method for accommodating a fractional level of detail (LOD) image data request using image data indexed at integer LOD steps, comprising:
    (a) receiving, from a client, a request for image data at a fractional LOD value, wherein the fractional LOD value is not an integer, and wherein the requested image data is indexed at integer LOD steps;
    (b) obtaining a set of features associated with the requested image data at a range of LOD values between a first integer endpoint LOD value and a second integer endpoint LOD value, wherein the fractional LOD value is between the first endpoint LOD value and the second endpoint LOD value;
    (c) assigning the fractional LOD value to the obtained features; and
    (d) providing the features and the image data at the fractional LOD value to the client, wherein at least one of steps (a)-(d) is implemented on one or more processors.

2. The method of claim 1, wherein step (c) comprises:
hashing an identifier associated with each feature;
computing a hash cutoff value; and
comparing the hash cutoff value to the hashed identifier.

3. The method of claim 2, wherein the computing step comprises evaluating a mapping function to map the range of LOD values onto a range of integers.

4. The method of claim 2, wherein the hashing step comprises hashing one or more properties associated with each feature.

5. The method of claim 1, further comprising:
shifting the range of LOD values by a fractional LOD step for a specified change in feature density.

6. The method of claim 1, wherein step (c) comprises interpolating LOD values associated with the features.

7. The method of claim 1, further comprising determining the probability of a feature to be displayed at the fractional LOD value.

8. The method of claim 1, further comprising pre-computing the fractional LOD value.

9. The method of claim 1, wherein step (c) is based on an importance of the features in the image data.

10. The method of claim 9, further comprising ranking the features based on the importance.

11. A computer based system for providing image data at a fractional level of detail (LOD) using image data indexed at integer LOD steps, comprising:
    one or more processors; and
    an LOD assigner to assign fractional LOD values to features in image data and to provide the features and the image data at the fractional LOD values, wherein the fractional LOD values are not integers, wherein the image data is indexed at integer LOD steps, wherein the LOD assigner is implemented on the one or more processors.

12. The system of claim 11, further comprising:
    a retrieval engine to return features with a range of LOD values that include the fractional LOD values to the LOD assigner.

13. The system of claim 11, wherein the LOD assigner further comprises:
    a hashing engine to hash an identifier and one or more properties associated with each feature returned by the retrieval engine; and
    an LOD mapper to compute a hash cutoff value by mapping the range of LOD values onto a range of integers.

14. The system of claim 13, wherein the identifier is an alpha-numeric feature identifier.

15. The system of claim 11, further comprising a browser that displays the features and the image data at the fractional LOD values.

16. A computer implemented method of controlling density of displayed items in image data, comprising:
    (a) retrieving image data at a digital zoom level that is associated with a first LOD value, wherein the retrieved image data is indexed at integer LOD steps;
    (b) assigning fractional LOD values to a plurality of features in the retrieved image data, wherein the fractional LOD values are not integers; and
    (c) filtering the features using the fractional LOD values, wherein at least one of steps (a)-(c) is implemented on one or more processors.

17. A computer implemented method of smoothing transitions between image data, displayed at different level of detail (LOD) values, comprising:
    computing fractional LOD values of a plurality of features in retrieved image data, wherein the retrieved image data is indexed at integer LOD steps, wherein the fractional LOD values are not integers; and
    shifting LOD values of the features by a fractional LOD step for a specified change in feature density, wherein the fractional LOD step is not an integer, wherein the computing and the shifting steps are implemented on one or more processors.

* * * * *